United States Patent

Cosentino

[15] 3,662,745
[45] May 16, 1972

[54] METAL-METAL SALT ELECTRODE AND METHOD FOR MAKING THE SAME

[72] Inventor: Louis Ciro Cosentino, West Paterson, N.J.
[73] Assignee: Hoffmann-La Roche Inc., Nutley, N.J.
[22] Filed: June 30, 1969
[21] Appl. No.: 837,424

[52] U.S. Cl. ............................................. 128/2 E, 204/195
[51] Int. Cl. ............................................................ A61l 5/00
[58] Field of Search ............... 117/128.4, 160, 74, 75, 128; 136/19; 204/46, 56, 195; 252/514, 521; 128/2 E, 2.1 E

[56] References Cited

UNITED STATES PATENTS

| | | | |
|---|---|---|---|
| 3,426,746 | 2/1969 | Seamans, Jr. | 128/2.06 E |
| 3,380,835 | 4/1968 | Short | 117/160 R |
| 3,490,440 | 1/1970 | Mosiev et al. | 252/514 |

*Primary Examiner*—William E. Kamm
*Attorney*—Jon S. Saxe, Bernard S. Leon and Jacob Frank

[57] ABSTRACT

An improved electrode comprising a mixture of a metal and a metal salt incorporated into a matrix material. This basic electrode material is coatable on an electrically conducting substrate to provide an excellent quality, low cost electrode assembly. The method of making the same comprising forming a mixture of a metal and metal salt incorporating the resultant mixture into a matrix therefor and applying that resulting mixture to the electrically conducting substrate.

5 Claims, 3 Drawing Figures

PATENTED MAY 16 1972 3,662,745

INVENTOR.
LOUIS CIRO COSENTINO
BY Friedman & Goodman
Attorneys

METAL-METAL SALT ELECTRODE AND METHOD FOR MAKING THE SAME

BACKGROUND OF THE INVENTION

1. Field of the Invention

This invention relates to an improvement in an electrode for electro chemical use for the measurement of electromotive force and the passage of electrical current therethrough, and to a method for making the same.

2. Description of the Prior Art

Electrodes are used whenever it becomes necessary to convert from electronic conduction, conduction in a metal by valence electrons, to conduction in an ionic solution or gel. In ionic conduction charge is transferred by means of ions of much greater mass than electrons. An electrode is therefore a transducer much like a radio antenna. Electrodes are used in batteries, chemistry and medicine. In batteries they are used to convert chemical energy into electrical energy. In chemistry, they may be used to study chemical reactions and to determine the activity (concentration) of various ions. In medicine they are used to monitor the living organisms ion movements, electrocardiogram, electroencephalogram, etc.

There are a number of properties of electrodes common to all these uses which are a measure of how well an electrode functions. The first property is the potential measured between an electrode and another standard electrode, or the potential between two identical electrodes, the latter commonly referred to as "offset potential."

In the case of a silver, silver chloride electrode referred to as the "standard hydrogen electrode," the potential $E$ at 25° C is determined by the chloride ion activity according to the equation:

$$E = 0.222 - 0.059 \log [Cl^-]$$

The electrode can therefore be used to measure the activity of chloride ions in a solution or be used as a reference electrode if placed in a solution of known chloride ion concentration.

The limits of its applicability are determined by the stability and reproducibility of its potential. A good measure of its limitations is provided by immersing two like electrodes in the same solution and measuring the difference in potential between them.

In theory one should read zero volts between any two electrodes prepared by the same process but in practice there exists some offset potential. Electrodes manufactured by conventional techniques deteriorate rapidly or show offsets ranging from hundreds of microvolts to tens of millivolts. The best commercially available electrodes so far as offset potentials are concerned are the silver, silver chloride pellet electrodes. These electrodes have offset potentials in the hundreds of microvolts range. These electrodes have certain disadvantages as follows:

1. Offset potentials are determined by stresses produced by the compression of the metal, metal chloride mixture during fabrication.
2. Offset potentials are also a function of particle sizes. In order to obtain a mixture which will flow easily in production equipment, large free flowing particles must be used. These larger particles have less surface area per unit volume and tend to limit the homogeneity of the mixture on a microscopic scale. Because of this lack of homogeneity and reduced surface area these electrodes have higher offset potentials than those produced with finer particles.
3. In order to maintain low and constant offset potentials any electrical connection made directly to the pellet electrode in contact with solution must be of the same metal as in the mixture. In the case of the silver, silver chloride electrode this contact can be a silver wire around which the pellet is compressed or a silver disk pressing against the pellet. In the former, the electrode cost is substantially increased. In the latter, an extra precision part must be fabricated. In both cases a further solder connection or weld to a wire must be made in order to make connection. This wire is generally not silver for cost purposes. If electrolyte should contact this new wire or connection, erratic and unstable offset potentials will be encountered. This last limitation is the major cause of failure of this type of electrode.
4. Another disadvantage of the pressed pellet type of electrode is its resultant size and shape. It must be put into the forms of a compacted mass of rather large size to be commercially feasible.
5. Another disadvantage of the pellet type electrode is that it is produced in an essentially non-porous form.

A second property of electrodes which gives some indication of performance is electrode impedance. This is commonly referred to as polarization. Generally low electrode impedance is desirable, especially in cases where substantial currents must flow. If we visualize a certain number of ions which are capable of exchanging charge with the metal phase, immediately adjacent to the metal but in the solution phase, when current is forced to flow through the electrode, these adjacent layers of ions are used up quickly. It then takes additional energy to cause ions to move up to the metal phase. This loss of energy at the electrode solution interface can be characterized by impedance. Impedance is inversely related to electrode surface area and current density. Low impedance type electrodes can be created artificially by providing a substantial atmosphere of mobile ions, capable of exchanging charges with the metal phase. This is done to some extent in metal, metal salt type pellet electrodes. Pellet type electrodes are made to be non-porous. This may be a disadvantage if one desires low electrode impedance. Porosity increases the overall amount of material available for charge exchange with the solution. Porosity decreases sensitivity of the electrode to physical movement in the solution or motion of the electrode. This sensitivity to physical movement is a common cause of signal artifact in biological measurements and a significant contribution to the state of the art would be an electrode which is insensitive to motion of the surrounding medium. Porosity on the other hand decreases the response time of the electrode to changes in ionic concentration in the solution which is undesirable in the field of chemical measurements. As mentioned, pellet type electrodes must be fabricated from large particles, and this also tends to increase electrode impedance. It would, therefore, be highly desirable to produce a low impedance, stable electrode which not only overcomes the problems of the prior art, but is extremely inexpensive to produce.

SUMMARY OF THE INVENTION

It is therefore among one of the principal objectives of this invention to produce a low impedance, stable electrode system which is of high quality and yet is extremely economical to produce. In accord with the invention, there has now been discovered an improved electrode comprising broadly a metal-metal salt and a matrix material. This basic electrode material is coatable on an electrically conducting substrate to provide an excellent quality electrode assembly.

The method of making the electrode comprises preparing in admixture a metal and a metal salt and incorporating the mixture into a matrix material therefor, then applying that resulting mixture to an electrically conducting support.

BRIEF DESCRIPTION OF THE DRAWING

The invention will be hereinafter more fully described with reference to the accompanying drawing in which.

DESCRIPTION OF THE SPECIFIC EMBODIMENTS

Figure 1:
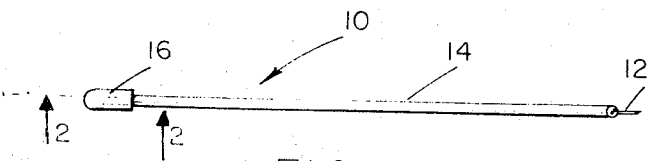
FIG. 1 is a plan view showing an electrode made in the manner in accord with the invention.
Figure 2:
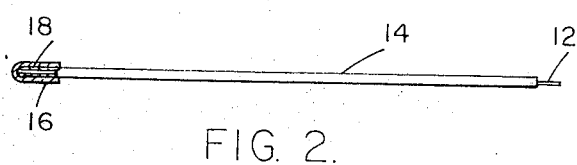
FIG. 2 is a sectional view taken along line 2—2 of FIG. 1.
Figure 3:
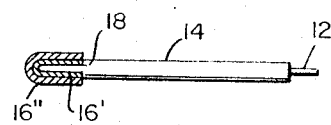
FIG. 3 is a sectional view taken along line 2—2 of FIG. 1 disclosing the two-coat species of the present invention.

The improved electrode of the invention is produced by intimately admixing the metal and metal salt components together in powdered form and thereafter incorporating the metal-metal salt mixture into a matrix material therefor. The matrix may be any substance which will form a liquid or paste of the metal-metal salt mixture, which liquid or paste can then be applied to an electrically conducting substrate by dipping, spraying, painting or the like. Any electrically conducting substrate, such as copper, graphite, silver, platinum, or other suitable metal, may be coated in this manner. The result is that the metal is now converted into an electrode without having any solder or pressed connection, in contrast to the prior art described above. The support metal is isolated from solution contact by the surrounding matrix material into which is incorporated the metal-metal salt mixture. Electrical contact to the solution is provided by the metal-metal salt mixture.

The particular materials used in the electrode components are not pertinent to the invention and the choice of metal and metal salts will be determined by the specific electro-chemical application. As will be mentioned here, and throughout the specification, one of the critical tests will be whether the resultant electrode system is electrically conductive. The same materials which are used in conventional electrode components may be utilized, such as silver-silver chloride, silver-silver iodide, silver-silver bromide, silver-silver sulfide, copper-copper sulfide and bismuth-bismuth fluoride, merely to name a few.

While the ratio of the two components of the mixture is not critical, the ratios may range from about 20 to 80 percent by weight, metal to metal chloride to about 80 to 20 percent metal to metal chloride.

The matrix material will be any suitable material which will form a liquid or paste of the metal-metal salt mixture so that it can be applied to the electrically conducting support. Desirably, the matrix material is a waterproof polymer such as commercially available thermoplastic acrylic ester polymers, cellulose acetates, or various commercially available epoxy polymers. While waterproof polymers are preferred as matrix materials for their coating characteristics, it is to be understood that any suitable material which will allow the metal-metal salt mixture to be applied in liquid or paste form to the electrically conducting support will be useable as the matrix. Again, one of the ultimate critical tests of the particular polymer, or other matrix material, and the amounts employed, will be, whether the resultant electrode system is electrically conductive. The matrix acts to hold the whole electrode system together, that is it adds structural strength and renders the metal-metal salt mixture tenable to the support. The amount of polymer to metal-metal salt mixture is not particularly critical and may range between about 4 and 50 percent by weight polymer matrix to between about 96 and 50 percent by weight metal-metal salt mixture. Preferably, the polymer is dissolved before use with a suitable organic solvent, such as cellosolve acetate or other like ester solvent material, e.g., ethyl acetate, propyl acetate, isopropyl acetate, butyl acetate, isobutyl acetate, primary amyl acetate, methyl amyl acetate, 2-ethylhexyl acetate, methyl cellosolve acetate, butyl cellosolve acetate, carbitol acetate, butyl carbitol acetate, glycol diacetate and glyceryl triacetate. A ketone such as methyl ethyl ketone or acetone may also be used as a solvent. The solvent concentration may be between about 10 and 3 percent. However, the solvent is optional, since there are many polymeric systems which are solvent free, such as the epoxy resins. The overall mixture may include additional ingredients, such as grinding agents; plasticizers; dispersants to aid in producing fine homogenous mixture; and soluble or volatile particles which may be removed at a later time so as to leave a porous electrode surface.

After the basic electrode mixture has been prepared in either the paste or liquid form, it is applied to the electrically conducting support wire by any suitable means effective to coat the same, i.e., dipping, spraying or painting. Thereafter, the entire electrode assembly may be baked in an oven to effect a cure of the matrixed mixture. It can also be air-dried for curing purposes.

Describing now the method of making the improved electrode of the invention, according to one specific embodiment, a mixture of a metal, e.g. silver, and a metal salt, e.g. silver chloride, was prepared by intimately admixing the two in powdered form. A matrix material was then prepared comprising a hydrophobic polymer, e.g. acrylic ester resin, dissolved in an organic solvent, e.g. cellosolve acetate. Thereafter, the metal-metal salt mixture was incorporated into the polymer matrix and an electrically conductive substrate, e.g. a polyvinyl chloride insulated tinned copper wire, was then dipped into this final mixture to coat the same. The resulting product was then baked in an oven at approximately 200° F. until the coating was cured to a hard consistency. The so-formed improved electrode assembly proved to have low impedance characteristics and exhibited high stability.

According to the embodiment just described hereinabove, the polymers used are preferably hydrophobic to prevent water penetration to the conductive metal support; however, they require increased wetting time although a wetting agent may be employed. Moreover, the use of the hydrophobic polymer limits the active area, i.e. area of solution contact to the surface of the electrode.

Therefore, to improve electrode performance in another embodiment of the invention, as is illustrated in FIG. 6, the hydrophobic polymer matrixed electrodes having a first coat 16' are in turn coated with another conductive coating 16" comprising a metal-metal chloride mixture, such as silver-silver chloride, incorporated within a hydrophlic polymer matrix. This recoated product may then be baked, as before, to cure the coating to a hard consistency. The hydrophilic polymer is a suitable water soluble polymer, or slightly water soluble polymer or combination of both soluble and insoluble types such as sodium carboxymethylcellulose, hydroxethylcellulose, ethylhydroxcycellulose, natural gums (sodium carrageenan, gum tragacanth), ethylene oxide polymers, copolymers of methyl vinyl ether and maleic anhydride, or the like. This second coating new form of electrode now results in a wettable coating over the originally formed electrode which acts like a porous "sponge-type" electrode. Accordingly, the active area of the electrode is greatly increased and the electrode shows low impedance, increased rate of wettability, extremely low offset potentials (microvolts), and very low sensitivity to motion artifacts. The concentration of hydrophilic matrix materials, as before, are again not critical and depend on the particular matrix material used, the ultimate test being whether the electrode system prepared is electrically conductive.

Referring now to the figures of the drawings, there is shown therein an electrode 10 prepared in accordance with the invention. The electrode 10 comprises a tinned copper wire 12 which has been provided with a polyvinyl chloride insulation 14 (standard connecting wire). In the manner according to the method of the invention, described above, an exposed end 18 of the copper wire 12 is dipped into the electrode matrixed mixture and thereafter cured in an oven to provide a hard beaded tip of electrode material 16 thereon. This then very simply forms the completed electrode 10 which is in a condition suitable for electrochemical use. It is again emphasized that there are no soldered junctions and that the wire is completely safe from electrolyte contact.

This novel electrode also can be, according to one embodiment of the invention, suitably connected by conventional means to an electromotive force measuring device, such as an electrocardiograph.

It is also to be understood that while the preferred sequence of coating an electrically conducting substrate has been described hereinabove, the coatings may be applied singly or successively in any order, or admixed together in any combination.

Thus, by the present invention there is provided a biomedical electrode of extremely reduced cost (a matter of a few cents in comparison to the average 15 dollar cost of prior art electrodes), yet of low impedance and high stability and low sensitivity to motions of the subject wearer.

The invention will be hereinafter further described with reference to the accompanying illustrative examples.

EXAMPLE I

In a mortar and pestle were intimately admixed the following components: three parts by weight powdered silver, 1 part by weight powdered silver chloride and one-half part by weight 5 micron particle size aluminum oxide.

There was also prepared 28.6 percent by weight of an acrylic ester resin (commercially available as Acryloid B 66) dissolved in a butyl cellosolve acetate solvent. This mixture was designated Resin Mixture A.

Thereafter, 1 gram of the silver-silver chloride mixture was admixed with various portions of Mixture A. These are detailed as parts $a, b, c, d$ and $e$ below:

| | Ag, AgCl Mix | Mixture A |
|---|---|---|
| (a) | 1 gram | 0.3 gram |
| (b) | 1 gram | 0.4 gram |
| (c) | 1 gram | 0.5 gram |
| (d) | 1 gram | 0.6 gram |
| (e) | 1 gram | 1.5 grams |

Each of the resulting matrixed materials, i.e. those resulting from the mixture shown in $a, b, c, d$ and $e$ were then used to make electrodes by dipping the ends of unstripped polyvinyl chloride insulated tinned copper wire therein and baking in an oven at 200° F.

Test results of electrodes in electrode jelly (Telemedics Inc) were as follows:

| Mixture | Offset Potential | Noise | Impedance | Motion sensitivity |
|---|---|---|---|---|
| a | less than 1$\mu$v | ±25$\mu$v | low | high |
| b | less than 2.2$\mu$v | <250$\mu$v | low | high |
| c | less than 2.2$\mu$v | <250$\mu$v | low to moderate | high |
| d | less than 500$\mu$v | <250$\mu$v | moderate | high |
| e | less than 1$\mu$v | <250$\mu$v | high | high |

EXAMPLE II

In a mortar and pestle were intimately admixed the following components: 3 parts by weight powdered silver, 1 part by weight powdered silver chloride and one-half part by weight 5 micron size aluminum oxide.

There was also prepared 14.3 percent by weight of an acrylic ester resin (commercially available as Acryloid B 66) dissolved in a butyl cellosolve acetate solvent. This mixture was designated Resin Mixture B.

Thereafter, one gram of the silver-silver chloride mixture was admixed with the following portion of Mixture B. This is detailed as part $f$ below:

| Ag, AgCl Mix | Mixture B |
|---|---|
| (f) 1 gram | 0.28 gram |

The resulting matrixed material, i.e. that resulting from the mixture shown in $f$ was then used to make electrodes by dipping the ends of unstripped polyvinyl chloride insulated tinned copper wire therein and baking in an oven at 200° F.

Test results of electrodes in electrode jelly were as follows:

| Mixture | Offset Potential | Noise | Impedance | Motion Sensitivity |
|---|---|---|---|---|
| f | less than 3$\mu$v | 250$\mu$v | low | high |

EXAMPLE III

In a mortar and pestle were intimately admixed the following components: 3 parts by weight powdered silver, 1 part by weight powdered silver chloride and one-half part by weight 5 micron size aluminum oxide.

There was also prepared 50 percent by weight of an acrylic ester resin (commercially available as Acryloid B 66) dissolved in a butyl cellosolve acetate solvent. This mixture was designated Resin Mixture C.

Thereafter, one gram of the silver-silver chloride mixture was admixed with the following portion of Mixture C. This is detailed as part $g$ below:

| Ag, AgCl Mix | Mixture C |
|---|---|
| (g) 1 gram | 0.3 gram |

The resulting matrixed material, i.e. that resulting from the mixture shown in $g$ was then used to make electrodes by dipping the ends of unstripped polyvinyl chloride insulated tinned copper wire therein and baking in an oven at 200° F.

Test results of electrodes in electrode jelly were as follows:

| Mixture | Offset Potential | Noise | Impedance | Motion Sensitivity |
|---|---|---|---|---|
| g | less than 2$\mu$v | <250$\mu$v | low | high |

EXAMPLE IV

In a mortar and pestle were intimately admixed the following components: 3 parts by weight powdered silver, 1 part by weight powdered silver chloride and one-half part by weight 5 micron size aluminum oxide.

There are also prepared 28.6 percent by weight of an acrylic ester resin (commercially available as Acryloid B 66) dissolved in methylethyl ketone solvent. This mixture was designated Resin Mixture D.

Thereafter, one gram of the silver-silver chloride mixture was admixed with various portions of Mixture D. These are detailed as parts $h, i, j,$ and $k$ below:

| Ag, AgCl Mix | Mixture D |
|---|---|
| (h) 1 gram | 0.3 gram |
| (i) 1 gram | 0.4 gram |
| (j) 1 gram | 0.5 gram |
| (k) 1 gram | 0.6 gram |

Each of the resulting matrixed materials, i.e. those resulting from the mixture shown in $h, i, j$ and $k$ were then used to make electrodes by dipping the ends of unstripped polyvinyl chloride insulated tinned copper wire therein and baking in an oven at 200° F.

Test results of electrodes in electrode jelly were substantially the same as those in Example I.

EXAMPLE V

In a mortar and pestle were intimately admixed the following components: 3 parts by weight powdered silver, 1 part by weight powdered silver chloride and one-half part by weight 5 micron size aluminum oxide.

There was also prepared 28.6 percent by weight of an acrylic ester resin (commercially available as Acryloid B 66) dissolved in acetone solvent. This mixture was designated Resin Mixture D.

Thereafter, 1 gram of the silver-silver chloride mixture was admixed with various portions of Mixture D. These are detailed as parts $l, m, n$ and $o$ below:

| Ag, AgCl Mix | | Mixture D |
|---|---|---|
| (i) 1 gram | 0.3 gram | |

| | | | |
|---|---|---|---|
| (m) | 1 gram | | 0.4 gram |
| (n) | 1 gram | | 0.5 gram |
| (o) | 1 gram | | 0.6 gram |

Each of the resulting matrixed materials, i.e. those resulting from the mixture shown in l, m, n and o were then used to make electrodes by dipping the ends of unstripped polyvinyl chloride insulated tinned copper wire therein and baking in an oven at 200° F.

Test results of electrodes in electrode jelly were substantially the same as those of Example I.

EXAMPLE VI

In a mortar and pestle were intimately admixed the following components: 0.5 parts by weight powdered silver, 1 part by weight powdered silver chloride and 0.1 part by weight 5 micron size aluminum oxide.

Thereafter, 1 gram of the silver-silver chloride mixture was admixed the following portion of Mixture A. This is detailed as part p below:

| Ag, AgCl Mix | | Mixture A |
|---|---|---|
| (p) | 1 gram | 0.4 gram |

The resulting matrixed material, i.e. resulting from the mixture shown in p was then used to make electrodes by dipping the ends of unstripped polyvinyl chloride insulated tinned copper wire therein and baking in an oven at 200° F.

Test results of electrodes in electrode jelly were as follows:

| Mixture | Offset Potential | Noise | Impedance | Motion Sensitivity |
|---|---|---|---|---|
| p | less than 2.0μv | <250μv | low | high |

EXAMPLE VII

In a mortar and pestle were intimately admixed the following components: 1 part by weight powdered silver, 1 part by weight powdered silver chloride and one-half part by weight 5 micron size aluminum oxide.

Thereafter, 1 gram of the silver-silver chloride mixture was admixed the following portion of Mixture A. This is detailed as part q below:

| Ag, AgCl Mix | | Mixture A |
|---|---|---|
| (q) | 1 gram | 0.4 gram |

The resulting matrixed material, i.e. resulting from the mixture shown in q was then used to make electrodes by dipping the ends of unstripped polyvinyl chloride insulated tinned copper wire therein and baking in an oven at 200° F.

Test results of electrodes in electrode jelly were substantially the same as those obtained in Example VI.

EXAMPLE VIII

In a mortar and pestle were intimately admixed the following components: 2 parts by weight powdered silver, 1 part by weight powdered silver chloride and one-half part by weight 5 micron size aluminum oxide.

Thereafter, 1 gram of the silver-silver chloride mixture was admixed the following portion of Mixture A. This is detailed as part r below:

| Ag, AgCl Mix | | Mixture A |
|---|---|---|
| (r) | 1 gram | 0.4 gram |

The resulting matrixed materials, i.e. those resulting from the mixture shown in r was then used to make electrodes by dipping the ends of unstripped polyvinyl chloride insulated tinned copper wire therein and baking in an oven at 200° F.

Test results of electrodes in electrode jelly were substantially the same as those obtained in Example VI.

EXAMPLE IX

In a mortar and pestle were intimately admixed the following components: 3 parts by weight powdered silver, 1 part by weight powdered silver chloride and one-half part by weight 5 micron size aluminum oxide.

There was also prepared 5 percent by weight of a cellulose resin (sodium carboxymethylcellulose commercially available as Natrasol) dissolved in water. This mixture was designated Resin Mixture E.

Thereafter, 1 gram of the silver-silver chloride mixture was admixed with various portions of Mixture E. This is detailed as part s below:

| Ag, AgCl Mix | | Mixture E |
|---|---|---|
| (s) | 1 gram | 0.4 gram |

The resulting matrixed material, i.e. that resulting from the mixture shown in s was then used to make electrodes by dipping the ends of electrodes prepared according to Example I part C. therein and baking in an oven at 200° F.

Test results of electrodes in electrode jelly were as follows:

| Mixture | Offset Potential | Noise | Impedance | Motion Sensitivity |
|---|---|---|---|---|
| s | less than 500μv | <50μv | very low | very low |

EXAMPLE X

In a mortar and pestle were intimately admixed the following components: 0.66 grams powdered silver, 0.22 grams powdered silver chloride, 0.12 grams 5 micron size aluminum oxide, and 0.5 grams of a cellulose resin (commercially available as Natrasol).

There was also prepared 28.6 percent by weight of an acrylic ester resin (commercially available as Acryloid B 66) dissolved in a butyl cellosolve acetate solvent. This mixture was previously designated Resin Mixture A.

Thereafter, one gram of the silver-silver chloride, Natrasol mixture was admixed with Mixture A. This is detailed as part t below:

| Ag, AgCl, Natrasol Mix | | MIXTURE A |
|---|---|---|
| (t) | 1 gram | 0.5 gram |

The resulting matrixed materials, i.e. that resulting from the mixture shown in t was then used to make electrodes by dipping the ends of unstripped polyvinyl chloride insulated tinned copper wire therein and baking in an oven at 200° F.

Test results of electrodes in electrode jelly were as follows:

| Mixture | Offset Potential | Noise | Impedance | Motion Sensitivity |
|---|---|---|---|---|
| t | less than 2μv | <50μv | low | low |

EXAMPLE XI

In a mortar and pestle were intimately admixed the following components: 3 parts by weight powdered silver, 1 part by weight powdered silver chloride and one-half part by weight 5 micron size aluminum oxide.

There was also prepared 15 percent by weight of an copolymer resin (poly (methyl vinyl ether/maleic anhydride) commercially available as Gantrez AN-149) dissolved in acetone solvent. This mixture was designated Resin Mixture F.

Thereafter, 1 gram of the silver-silver chloride mixture was admixed with various portions of Mixture F. This is detailed as part u below:

| Ag, AgCl Mix | | Mixture F |
|---|---|---|
| (u) | 1 gram | 0.4 gram |

The resulting matrixed materials, i.e. that resulting from the mixture shown in u was then used to make electrodes by dipping the ends of unstripped polyvinyl chloride insulated tinned copper wire therein and baking in an oven at 200° F.

Test results of electrodes in electrode jelly were as follows:

| Mixture | Offset Potential | Noise | Impedance | Motion Sensitivity |
|---|---|---|---|---|
| u | less than 2 millivolts decreasing in 2 hours to <50μv | 5μv | low | low |

EXAMPLE XII

In a mortar and pestle were intimately admixed the following components: 3 parts by weight powdered silver, 1 part by weight powdered silver chloride and one-half part by weight 5 micron size aluminum oxide.

There was also prepared 11 percent by weight of a copolymer resin (commercially available as Gantrez AN–149) dissolved in water. To 9 grams of this 14 grams of a solvent, acetone was added. To the resulting mixture 0.5 grams of a cellulose resin (commercially available as Methocel 60 H.G.) was added. This mixture was designated Resin Mixture G.

Thereafter, 1 gram of the silver-silver chloride mixture was admixed with Mixture G. This is detailed as part v below:

| | Ag, AgCl Mix | Mixture G |
|---|---|---|
| (v) | 1 gram | 0.5 gram |

The resulting matrixed materials, i.e. that resulting from the mixture shown in v was then used to make electrodes by dipping the ends of unstripped polyvinyl chloride insulated tinned copper wire therein and baking in an oven at 200° F.

Test results of electrodes in electrode jelly were as follows:

| Mixture | Offset Potential | Noise | Impedance | Motion Sensitivity |
|---|---|---|---|---|
| v | less than 5μv | <5μv | very low | very low |

EXAMPLE XIII

In a mortar and pestle were intimately admixed the following components: 3 parts by weight powdered silver, 1 part by weight powdered silver chloride and one-half part by weight 5 micron size aluminum oxide.

Thereafter, 1 gram of the silver-silver chloride mixture was admixed with Mixture G, in Example XII, according to part v.

The resulting matrixed materials, i.e. those resulting from the mixture shown in v was then used to make electrodes by dipping the ends of electrodes prepared according to Example I part b therein and baking in an oven at 200° F.

Test results of electrodes in electrode jelly were as follows:

| Mixture | Offset Potential | Noise | Impedance | Motion Sensitivity |
|---|---|---|---|---|
| b coated with v | less than 50μv | <5μv | very low | very low |

EXAMPLE XIV

In a mortar and pestle were intimately admixed the following components: 3 parts by weight powdered silver, 1 part by weight powdered silver chloride and one-half part by weight 5 micron size aluminum oxide.

There was also prepared 20 parts by weight of an amine hardner (commercially available as Araldite 956) to 100 parts by weight of an epoxy resin (commercially available as Araldite 502). This mixture was designated Resin Mixture H.

Thereafter, 1 gram of the silver-silver chloride mixture was admixed with various portions of Mixture H. These are detailed as parts w, x, and y below:

| | Ag, AgCl Mix | Mixture H |
|---|---|---|
| (w) | 1 gram | 0.05 gram |
| (x) | 1 gram | 0.1 gram |
| (y) | 1 gram | 0.2 gram |

Each of the resulting matrixed materials, i.e. those resulting from the mixture shown in w, x and y were then used to make electrodes by dipping the ends of unstripped polyvinyl chloride insulated tinned copper wire therein and baking in an oven at 200° F.

Test results of electrodes in electrode jelly would be essentially similar to those in Example I.

What is claimed is:

1. In an electrode component for electrochemical use the combination of an electrically conducting substrate and a mixture of a powdered metal and a powdered salt of the metal, a matrix material, said mixture being contained within the matrix material, said matrixed mixture constituting a nonpressed coating over said electrically conducting substrate, said matrix material comprising a hydrophobic polymer.

2. In an electrode component for electrochemical use the combination of an electrically conducting substrate and a mixture of a powdered metal and powdered salt of the metal, a matrix material, said mixture being contained within the matrix material, said matrixed mixture constituting a nonpressed coating over said electrically conducting substrate, said matrix material comprising a mixture of a hydrophobic polymer and a hydrophilic polymer.

3. In an electrode component for electrochemical use the combination of an electrically conducting substrate and a first mixture of a powdered metal and a powdered salt of the metal, a first matrix material, said first mixture being contained within the first matrix material to form a first matrixed mixture constituting a first coating over said electrically conducting substrate, a second mixture of a powdered metal and a powdered salt of the metal, a second matrix material, said second mixture being contained within the second matrix material to form a second matrixed mixture constituting a second coating over the first coating, said first matrix material comprising a hydrophobic polymer and said second matrix material comprising a hydrophilic polymer.

4. In an electrode component for electrochemical use the combination of an electrically conducting substrate and a first mixture of a powdered metal and a powdered salt of the metal, a first matrix material, said first mixture being contained within the first matrix material to form a first matrixed mixture constituting a first coating over said electrically conducting substrate, a second mixture of a powdered metal and a powdered salt of the metal, a second matrix material, said second mixture being contained within the second matrix material to form a second matrixed mixture constituting a second coating over the first coating, said first matrix material comprising a mixture of hydrophobic and hydrophilic polymers and said second matrix material comprising a mixture of hydrophobic and hydrophilic polymers.

5. In an electrode component for electrochemical use the combination of an electrically conducting substrate and a first mixture of a powdered metal and a powdered salt of the metal, a first matrix material, said first mixture being contained within the first matrix material to form a first matrixed mixture constituting a first coating over said electrically conducting substrate, a second mixture of a powdered metal and a powdered salt of the metal, a second matrix material, said second mixture being contained within the second matrix material to form a second matrixed mixture constituting a second coating over the first coating, said first matrix material comprising a hydrophobic polymer and said second matrix material comprising a mixture of hydrophobic and hydrophilic polymers.

* * * * *

Disclaimer 3,662,745.—*Louis Ciro Cosentino*, West Paterson, N.J. METAL-METAL SALT ELECTRODE AND METHOD FOR MAKING THE SAME. Patent dated May 16, 1972. Disclaimer filed Jan. 27, 1975, by the assignee, *Medtronic, Inc.*

Hereby enters this disclaimer to claim 1 of said patent.

[*Official Gazette June 10, 1975.*]